United States Patent [19]

Russ, Sr.

[11] 4,340,378
[45] Jul. 20, 1982

[54] V-BLOCK COMPONENT AND BELT

[75] Inventor: Paul E. Russ, Sr., Littleton, Colo.

[73] Assignee: The Gates Rubber Company, Denver, Colo.

[21] Appl. No.: 184,713

[22] Filed: Sep. 8, 1980

[51] Int. Cl.³ .............................................. F16G 5/20
[52] U.S. Cl. ..................................... 474/244; 156/139
[58] Field of Search ............... 474/201, 240, 242, 244, 474/245; 156/139

[56] References Cited

U.S. PATENT DOCUMENTS

| 1,446,018 | 2/1923 | Reeves | 474/244 |
| 2,322,466 | 6/1943 | Perry | 474/242 |
| 2,343,367 | 3/1944 | Conradson | 474/244 |
| 2,647,410 | 8/1953 | Reeves | 474/244 |
| 3,808,901 | 5/1974 | Berg | 474/242 |
| 4,177,687 | 12/1979 | Russ | 474/242 |

Primary Examiner—Lawrence J. Staab
Attorney, Agent, or Firm—H. W. Oberg, Jr.; C. H. Castleman, Jr.; Raymond Fink

[57] ABSTRACT

A V-block belt component with a polymeric block molded around a diagonal side portion of a U-shaped reinforcement with parallel leg members, the polymeric block having two molded leg member receiving cavities, one cavity juxtaposed and oriented with each leg member.

4 Claims, 4 Drawing Figures

U.S. Patent  Jul. 20, 1982  4,340,378
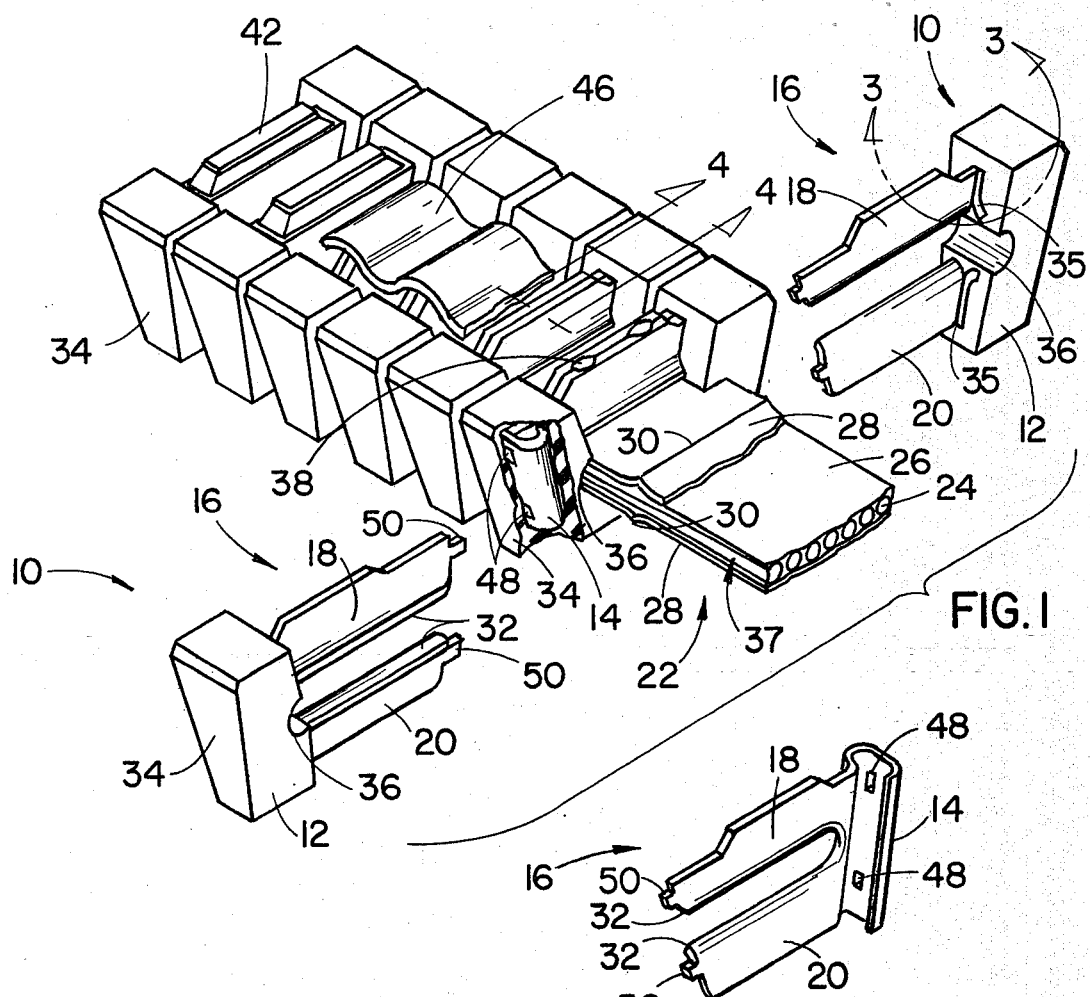
FIG. 1
FIG. 2
PRIOR ART
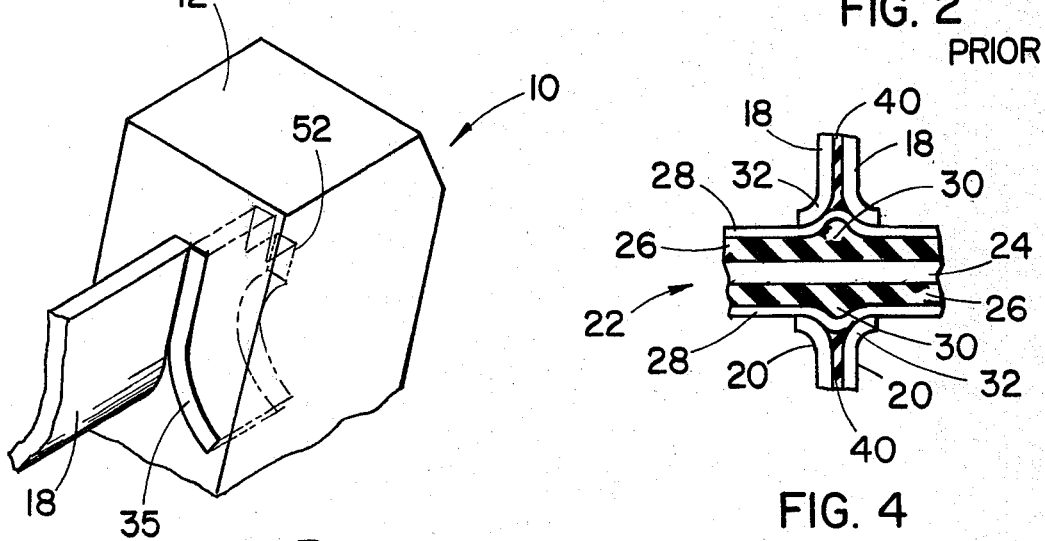
FIG. 3
FIG. 4

V-BLOCK COMPONENT AND BELT

BACKGROUND OF THE INVENTION

The invention relates to machine elements and mechanisms, but more particularly, the invention relates to V-block components and V-block belts.

V-block belts are extensively used as variable speed belts because their construction allows a low thickness to width ratio to accommodate desirable speed ratio changes in variable speed belt drives. U.S. Pat. No. 4,177,687 teaches how to solve many horsepower/torque problems of V-block belts by using a reinforcement that surrounds a flat band type load carrying member and where the reinforcement is at least partially embedded in an elastomer. The Patent discusses assembling a two-piece reinforcement around a precured flat band load carrying member having ribs and then injection molding polymeric material around diagonal side members of the so-assembled reinforcement to form V-sides on each block. High injection pressures around the diagonal side members and load carrying member may disturb transverse alignment or cause transverse displacement of the reinforcement in relation to the load carrying member resulting in a belt that runs rough. Simultaneously injection molding elastomer around several successive diagonal side members substantially limits the elastomer shaping possibilities because of mold space limitations.

SUMMARY OF THE INVENTION

In accordance with the invention, a block component for a V-block type power transmission belt is provided. An elastomeric block is molded around a diagonal side member of a generally U-shaped reinforcement with substantially parallel leg members. The elastomeric block has a leg member receiving cavity molded juxtaposed and oriented with each leg members of the U-shaped reinforcement. The two cavities define a means for receiving leg members of a second, similarly configured reinforcement and means for aligning both reinforcements around a flat band load carrying member.

An advantage of the invention is that elastomeric blocks may be individually premolded to diagonal side members of individual U-shaped reinforcements to ensure precise location of the block with respect to the reinforcement and to minimize irregularities that could result in a rough running belt.

Another advantage of the invention is that there are no mold size restrictions impacted by a multi-cavity belt mold so that the elastomeric block may be molded in an individual component mold with intricate shapes for the purpose of improving belt operating characteristics with improved block shapes.

These and other advantages or objects of the invention will be apparent after reviewing the drawings and description thereof wherein:

FIG. 1 is an exploded isometric partial view of a V-block belt of the invention with portions cutaway;

FIG. 2 is an isometric view of a generally U-shaped reinforcement member known in the prior art;

FIG. 3 is an enlarged partial view taken along the line 3—3 of FIG. 1 showing the shape of a molded cavity with phantom lines; and FIG. 4 is a view taken along the line 4—4 of FIG. 1.

DESCRIPTION OF A PREFERRED EMBODIMENT

In the Figures, the block component 10 of the invention has a polymeric block 12 integrally molded around a diagonal side member 14 of a U-shaped reinforcement 16 having two spaced and substantially parallel leg members 18, 20.

The component 10 is an improvement for belts of the type as disclosed in U.S. Pat. No. 4,177,687 where two U-shaped reinforcements are assembled around a flat band load carrying member. Similar thereto, a flat band load carrying member 22 is used which has a tensile reinforcement such as spiralled cord 24 positioned between layers of an elastomeric matrix 26 that may contain fibrous reinforcement such as woven fabric 28. The load carrying member may be preformed with transversely oriented ribs 30 adapted for meshing with rib engaging portions 32 of the leg members. Optionally, the ribs may be post-formed onto the load carrying member in a subsequent molding operation as taught by the '687 patent after assembly of several components 10.

The polymeric block 12 may be made with any suitable elastomer or plastic such as the natural and synthetic rubbers, phenolics, urethanes and blends thereof. Fibrous reinforcement may optionally be embedded in the polymeric block to improve structural integrity. The block has a V-side 34 that defines a friction drive surface precisely molded juxtaposed the diagonal side member and two leg member receiving cavities 35, that are each molded juxtaposed and oriented with a leg member of the reinforcement. The molded cavities define a means for receiving and aligning leg members of another similarly configured block component. Optionally, the block has a groove 36 positioned between and normal to the molded cavities that defines a means for contacting an edge portion 37 of the load carrying member to further enhance component transverse alignment with a load carrying member during belt assembly.

The belt is assembled by sliding and pressing two block components from opposite directions over the flat band load carrying member so that the leg members penetrate the molded cavities. When the load carrying member is premolded with spaced transverse ribs along its exterior inner and outer surfaces, the rib engaging portions 32 are placed to engage the ribs. The molded cavities of each component grip the penetrating leg portions and hold both components in transverse alignment until the so-assembled components can be more rigidly attached together such as by spot welding 38, adhesive bonding 40, or embedding the assembled leg members in an elastomeric matrix 42. With the latter type of attachment, ribs may be simultaneously formed by placing the assembled components and uncured load carrying member in a multi-cavity mold with additional elastomer 46 and then pressuring the load carrying member as described in U.S. Pat. No. 4,177,687. The premolded blocks maintain transverse alignment because they are entrapped by mold cavity walls. The grooves, when used, contact the edge portion of the load carrying member to further enhance transverse alignment of the blocks with the load carrying member during the embedding operation.

Optionally, the diagonal side member may have apertures 48 for receiving protuberances 50 on the end of each leg member. A depression 52 is molded in each leg member receiving cavity to receive the protuberance and align it with the aperture of the diagonal side member. The aperture and protuberance serve as further means for aligning and attaching and interlocking block components to the flat band type load carrying member.

The molded cavities preclude the block components from being readily misaligned on the load carrying member during attachment. The net effect is that the friction drive surfaces of the components are in circumferential alignment with each other and the leg members are in transverse alignment with the load carrying section for smooth belt running. Optionally, but preferably, the block components are hermaphroditic so that only one component configuration is required to fabricate a block belt.

The foregoing description is made for purpose of illustration only and is not intended to limit the scope of the invention which is to be determined from the appended claims.

What is claimed is:

1. A block component for a V-block power transmission belt having a flat band load carrying member, the component comprising:
    a generally U-shaped reinforcement member including two spaced and substantially parallel leg members that each have means for engaging the load carrying member, the leg portions interconnected to and coextensive from a diagonal side member; and
    a polymeric block integrally molded around the diagonal side member and adjacent portions of the interconnected leg members, the block having a leg member receiving cavity molded juxtaposed and oriented with each of the two leg members, the two cavities extending to the diagonal side member and defining means for receiving and aligning leg members, and the block defining a friction drive surface juxtaposed the diagonal side member.

2. The V-block component as claimed in claim 1 wherein the polymeric block between the two leg member receiving cavities has a groove that defines a means for receiving an edge portion of the load carrying member.

3. The V-block component as claimed in claim 1 wherein the diagonal side member has a hole that opens to each of the leg member receiving cavities.

4. The V-block component as claimed in claim 1 wherein the U-shaped reinforcement and polymeric block define a hermaphroditic component.

* * * * *